United States Patent
Park et al.

(10) Patent No.: US 9,607,771 B2
(45) Date of Patent: Mar. 28, 2017

(54) FLEXIBLE SUPERCAPACITOR, METHOD OF MANUFACTURING THE SAME, AND DEVICE INCLUDING THE FLEXIBLE SUPERCAPACITOR

(75) Inventors: Young-jun Park, Suwon-si (KR); Jong-min Kim, Yongin-si (KR); Zhong-lin Wang, Atlanta, GA (US); Joon-ho Bae, Atlanta, GA (US)

(73) Assignees: Samsung Electronics Co., Ltd., Gyeonggi-do (KR); Georgia Tech Research Corporation, Atlanta, GA (US)

( * ) Notice: Subject to any disclaimer, the term of this patent is extended or adjusted under 35 U.S.C. 154(b) by 496 days.

(21) Appl. No.: 13/064,425

(22) Filed: Mar. 24, 2011

(65) Prior Publication Data

US 2011/0235241 A1    Sep. 29, 2011

(30) Foreign Application Priority Data

Mar. 24, 2010   (KR) .................. 10-2010-0026411

(51) Int. Cl.
*H01G 9/00* (2006.01)
*H01L 41/00* (2013.01)
(Continued)

(52) U.S. Cl.
CPC ............... *H01G 9/02* (2013.01); *H01G 11/26* (2013.01); *H01G 11/30* (2013.01); *H01G 11/36* (2013.01);
(Continued)

(58) Field of Classification Search
CPC .......... H01G 9/155; H01G 9/058; H01G 9/15; Y02E 60/13
(Continued)

(56) References Cited

U.S. PATENT DOCUMENTS 6,356,433 B1    3/2002  Shi et al.
2005/0231893 A1*  10/2005  Harvey .................. 361/502
(Continued)

FOREIGN PATENT DOCUMENTS

JP        2004311417 A    11/2004
KR    1020010097673 A    11/2001
(Continued)

OTHER PUBLICATIONS

G. Ehlert, et al., "Zinc Oxide Nanowire Interphase for Enhanced Interfacial Strength in Lightweight Polymer Fiber Composites," *Applied Materials and Interfaces*, vol. 1, No. 8, pp. 1827-1833 (2009).

(Continued)

*Primary Examiner* — Jenny L Wagner
*Assistant Examiner* — Arun Ramaswamy
(74) *Attorney, Agent, or Firm* — Harness, Dickey & Pierce, P.L.C.

(57) ABSTRACT

A flexible supercapacitor, a method of manufacturing the same, and a device including the same are provided, the flexible supercapacitor includes a first flexible electrode assembly, a second flexible electrode assembly corresponding to the first flexible electrode assembly, a separator for preventing contact between the first flexible electrode assembly and the second flexible electrode assembly, and an electrolyte between the first flexible electrode assembly and the second flexible electrode assembly. The flexible supercapacitor may include a tube including the first flexible electrode assembly, the second flexible electrode assembly, the separator, and the electrolyte.

33 Claims, 10 Drawing Sheets

(51) Int. Cl.
*H02N 2/00* (2006.01)
*H01G 9/15* (2006.01)
*H01G 9/02* (2006.01)
*H01G 11/36* (2013.01)
*H01G 11/86* (2013.01)
*H01G 11/26* (2013.01)
*H01G 11/30* (2013.01)

(52) U.S. Cl.
CPC .............. *H01G 11/86* (2013.01); *Y02E 60/13* (2013.01); *Y10T 29/417* (2015.01)

(58) Field of Classification Search
USPC .......................... 361/502; 310/367; 29/25.03
See application file for complete search history.

(56) References Cited

U.S. PATENT DOCUMENTS

| | | | |
|---|---|---|---|
| 2006/0098389 A1* | 5/2006 | Liu et al. ...................... | 361/502 |
| 2008/0218939 A1 | 9/2008 | Marcus et al. | |
| 2008/0232028 A1* | 9/2008 | Zhao ............................. | 361/502 |
| 2009/0066195 A1* | 3/2009 | Wang et al. .................. | 310/367 |
| 2009/0168302 A1 | 7/2009 | Jiang et al. | |
| 2011/0216476 A1* | 9/2011 | Fleischer ............... | H01G 11/36 |
| | | | 361/502 |

FOREIGN PATENT DOCUMENTS

| | | |
|---|---|---|
| KR | 1020020010563 A | 2/2002 |
| KR | 10-0675923 B1 | 1/2007 |
| KR | 20090062912 A | 6/2009 |
| KR | 20090132543 A | 12/2009 |

OTHER PUBLICATIONS

Korean Office Action dated Jan. 12, 2016 for Korean Patent Application 10-2010-0026411 (with English translation).

* cited by examiner

FLEXIBLE SUPERCAPACITOR, METHOD OF MANUFACTURING THE SAME, AND DEVICE INCLUDING THE FLEXIBLE SUPERCAPACITOR

CROSS-REFERENCE TO RELATED APPLICATIONS

This application claims the benefit of priority under 35 U.S.C. §119 from Korean Patent Application No. 10-2010-0026411, filed on Mar. 24, 2010, in the Korean Intellectual Property Office, the disclosure of which is incorporated herein in its entirety by reference.

BACKGROUND

1. Field

Example embodiments relate to flexible supercapacitors, methods of manufacturing the same, and devices including the same.

2. Description of the Related Art

As mobile information and communication devices have become widely used and the amount of information transmitted by using such devices has grown, power consumption has also increased. Accordingly, active research has been conducted on a method of increasing battery capacity in order to easily use mobile information and communication devices.

There is a limitation in developing the green energy industry due to lack of high energy density storage devices. For example, a storage battery and a capacitor having high energy and high power density may be used in an electric vehicle.

However, it is quite difficult to continuously increase the energy density and power density despite on-going research and efforts.

Supercapacitors having a specific capacitance that is thousands of times greater than that of common electrostatic capacitors have been highlighted as the next generation energy storage media due to their higher power density, faster charge and discharge times, environmental friendliness, longer lifespan, and lower costs per charge/discharge cycle than the existing batteries.

A conventional supercapacitor is formed by injecting a liquid electrolyte between electrodes containing carbon on a metal film. Because a conventional supercapacitor is basically formed on a hard matter, it is difficult to apply a conventional supercapacitor to a flexible electronic device or a flexible nano device due to its lack of flexibility. Also, it is difficult to apply a conventional supercapacitor to a wearable electronic device requiring a small and lightweight design.

SUMMARY

Example embodiments relate to flexible supercapacitors, methods of manufacturing the same, and devices including the same.

Provided are flexible supercapacitors that are light weight, flexible, and durable, and that have a high specific capacitance. Provided are methods of manufacturing the supercapacitors. Provided are devices including the supercapacitors.

Additional aspects will be set forth in part in the description which follows and, in part, will be apparent from the description, or may be learned by practice of the presented embodiments.

According to example embodiments, a supercapacitor includes a first flexible electrode assembly, a second flexible electrode assembly corresponding to the first flexible electrode assembly, a separator for preventing contact between the first flexible electrode assembly and the second flexible electrode assembly, and an electrolyte injected between the first flexible electrode assembly and the second flexible electrode assembly.

The supercapacitor may further include a tube including the first flexible electrode assembly, the second flexible electrode assembly, the separator, and the electrolyte.

One of the first flexible electrode assembly and the second flexible electrode assembly may be located inside the other one.

The first flexible electrode assembly and the second flexible electrode may be twisted together.

The tube may be a rigid tube or a flexible tube.

The separator may include a first separator surrounding the first flexible electrode assembly, and a second separator surrounding the second flexible electrode assembly.

The one flexible electrode capacitor located inside the other flexible electrode capacitor may be surrounded by the separator.

The separator may be a porous separator through which ions pass. In other words, the separator is permeable to ions.

The first flexible electrode assembly may include a fiber, a seed layer formed on an outer circumferential surface of the fiber, and a plurality of nanowires formed on an outer circumferential surface of the seed layer to extend in a direction perpendicular to a longitudinal direction of the fiber. The second flexible electrode assembly may have the same structure as that of the first flexible electrode assembly.

According to example embodiments, a method of manufacturing a supercapacitor includes forming a first flexible electrode assembly, forming a second flexible electrode assembly, separating the first flexible electrode assembly from the second flexible electrode assembly by using a separator, and injecting an electrolyte between the first flexible electrode assembly and the second flexible electrode assembly.

The method may further include forming (or positioning) the first flexible electrode assembly, the second flexible electrode assembly, the separator, and the electrolyte in a tube.

One of the first flexible electrode assembly and the second flexible electrode assembly may be located inside the other one.

Separating the first flexible electrode assembly from the second flexible electrode assembly by using the separator may include surrounding the first flexible electrode assembly with a first separator, and surrounding the second flexible electrode assembly with a second separator.

Separating the first flexible electrode assembly from the second flexible electrode assembly by using the separator may include, surrounding the one flexible electrode assembly, which is located inside the other flexible electrode assembly, with the separator.

Forming the first flexible electrode assembly may include forming a seed layer on an outer circumferential surface of a fiber, and forming a plurality of nanowires on an outer circumferential surface of the seed layer so that the plurality of nanowires extend in a direction perpendicular to a longitudinal direction of the fiber. Forming the second flexible electrode assembly may be the same as the forming of the first flexible electrode assembly.

The plurality of nanowires may be formed by hydrothermal synthesis or chemical vapor deposition (CVD) synthesis.

The method may further include forming a conductive layer to cover surfaces of the plurality of nanowires.

According to example embodiments, an energy-generating storage device includes the supercapacitor, and a nano generator. The nano generator contacts the supercapacitor, and includes one or more fiber nanowires having piezoelectric characteristics. The nano generator further includes a tube including the one or more fiber nanowires.

Each of the one or more fiber nanowires may include a fiber, a seed layer formed on an outer circumferential surface of the fiber, and a plurality of nanowires formed on an outer circumferential surface of the seed layer to extend in a direction perpendicular to a longitudinal direction of the fiber.

The supercapacitor and the nano generator may be stacked side by side.

The supercapacitor and the nano generator may be alternately arranged.

A first electrode and a second electrode may be disposed on both terminals of each of the one or more fiber nanowires, one of the first electrode and the second electrode may be in Schottky contact with each of the one or more fiber nanowires, and the other electrode may be in ohmic contact with each of the one or more fiber nanowires.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Various example embodiments will now be described more fully with reference to the accompanying drawings in which some example embodiments are shown. However, specific structural and functional details disclosed herein are merely representative for purposes of describing example embodiments. Thus, the invention may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the invention.

In the drawings, the thicknesses of layers and regions may be exaggerated for clarity, and like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to more specifically describe example embodiments, various aspects will be described in detail with reference to the attached drawings. However, the present invention is not limited to example embodiments described.

Example embodiments relate to flexible supercapacitors, methods of manufacturing the same, and devices including the same.

Figure 1:
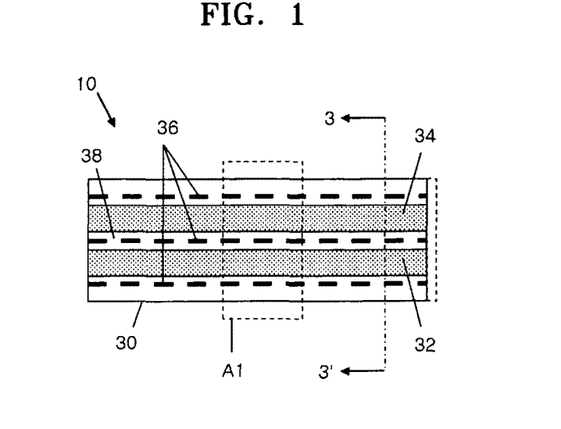
FIG. 1 is a cross-sectional view of a supercapacitor according to example embodiments.

FIG. 1 is a cross-sectional view of a nanowire supercapacitor according to example embodiments.

Referring to FIG. 1, a supercapacitor 10 includes a first fiber nanowire 32, a separator 36, an electrolyte 38, and a second fiber nanowire 34. The first fiber nanowire 32, the second fiber nanowire 34, and the separator 36 are covered with a sheath 30. The sheath 30 may be a rigid tube or a flexible tube. The first fiber nanowire 32, which is a flexible electrode assembly, corresponds to a first electrode. The second fiber nanowire 34, which is a flexible electrode assembly, corresponds to a second electrode. The separator 36 prevents contact between the first fiber nanowire 32 and the second fiber nanowire 34. Each of the first fiber nanowire 32 and the second fiber nanowire 34 is surrounded by the separator 36. The separator 36 may be a porous material layer (e.g., a ceramic separator or a polymer separator) through which ions of the electrolyte 38 pass. Because the first and second fiber nanowires 32 and 34 are high-density nanowires, surfaces of the first and second fiber nanowires 32 and 34 are rough. Accordingly, a short-circuit does not occur when the first and second fiber nanowires 32 and 34 come into contact with each other. The separator 36 may be optionally used. The electrolyte 38 may be, for example, $KNO_3$, $KOH$, or $H_2SO_4$. As such, the electrolyte 38 may be a liquid.

Figure 2:
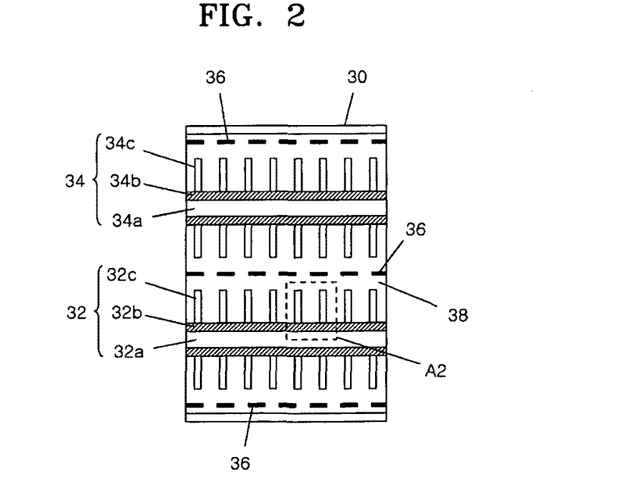
FIG. 2 is an enlarged cross-sectional view illustrating a first area of FIG. 1.
Figure 3:
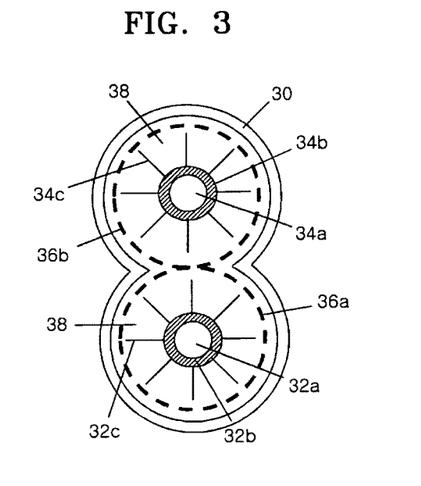
FIG. 3 is a side view of FIG. 2.

FIG. 2 is an enlarged cross-sectional view illustrating a first area A1 of FIG. 1. FIG. 3 is a side view of FIG. 2 or a cross-sectional view taken along line 3-3' of FIG. 1.

In FIG. 3, first and second nanowires 32c and 34c are marked by solid lines for convenience.

Referring to FIGS. 2 and 3, the first fiber nanowire 32 includes a first fiber 32a, a first seed layer 32b, and a plurality of first nanowires 32c. An outer circumferential surface of the first fiber 32a is covered with the first seed layer 32b. The plurality of first nanowires 32c are radially formed on an entire outer circumferential surface of the first seed layer 32b to extend in a direction perpendicular to the outer circumferential surface of the first seed layer 32b. Accordingly, the plurality of first nanowires 32c extends perpendicular to the outer circumferential surface of the first fiber 32a as well. Although several first nanowires 32c are illustrated in FIGS. 2 and 3, the plurality of first nanowires 32c are formed very densely on the entire outer circumferential surface of the first seed layer 32b.

The first fiber 32a may be any one of, for example, a polymer fiber, a carbon fiber, a metal fiber, and an optical fiber. The first seed layer 32b may be, for example, a gold (Au) layer, a zinc acetate layer, or a zinc oxide (ZnO) layer. The first seed layer 32b may be formed of the same material as, or a different material from, that of the first nanowires 32c. For example, if the first nanowires 32c are formed of ZnO, the first seed layer 32b may be formed of Au. The first seed layer 32b may have a thickness of, for example, about 0.1 nm to about 50 nm. The first nanowires 32c may be formed of a material having piezoelectric characteristics, for example, ZnO, polyvinylidene fluoride (PVDF), quartz, or lead zirconate titanate (PZT).

The second fiber nanowire 34 includes a second fiber 34a, a second seed layer 34b, and a plurality of second nanowires 34c. Arrangement relationships between the second fiber 34a, the second seed layer 34b, and the plurality of second nanowires 34c may have the same as arrangement relationships as the first fiber 32a, the first seed layer 32b, and the plurality of first nanowires 32c. The first and second fibers 32a and 34a may be formed of the same material, or different materials. The first and second seed layers 32b and 34b may be continuous layers or a layer including a plurality of dots (or seeds). The first and second seed layers 32b and 34b may be formed of the same material, or different materials. The first and second nanowires 32c and 34c may be formed of the same material, or different materials.

Referring to FIG. 3, a first separator 36a surrounds the first fiber nanowire 32, and a second separator 36b surrounds the second fiber nanowire 34. The first and second fiber nanowires 32 and 34, the first and second separators 36a and 36b, and the electrolyte 38 are surrounded by the sheath 30.

Figure 4:
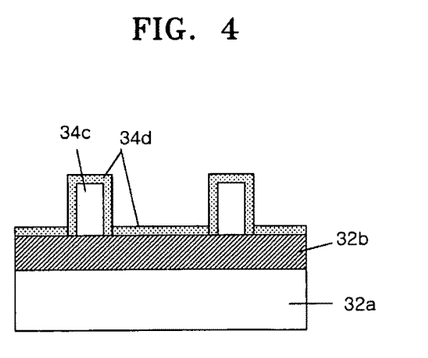
FIG. 4 is an enlarged cross-sectional view illustrating a second area of FIG. 2.
Figure 5:
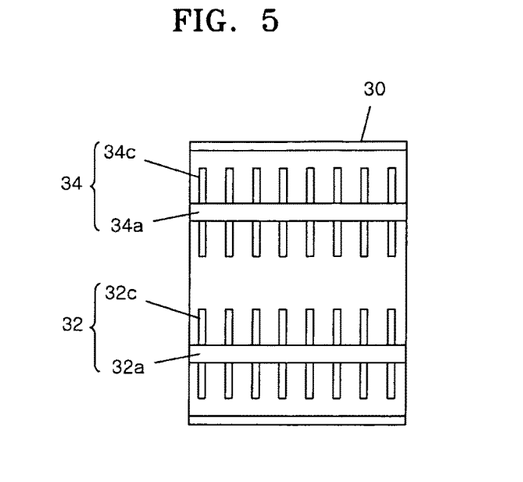
FIG. 5 is a cross-sectional view of FIG. 2, illustrating a case where a fiber of a fiber nanowire is a metal fiber.

FIG. 4 is an enlarged cross-sectional view illustrating a second area A2 of FIG. 2. FIG. 5 is a cross-sectional view of FIG. 2, illustrating a case where a fiber of a fiber nanowire is a metal fiber.

Referring to FIG. 4, a conductive layer 34d may be further formed to cover the first nanowires 34c and the outer circumferential surface of the first seed layer 32b in order to increase conductivity thereof. The conductive layer 34d may be a gold (Au) layer having a thickness of, for example, about 100 nm.

If each of the first and second fibers 32a and 34a is formed of a material having conductivity (e.g., metal), the conductive layer 34d may not be used. If each of the first and second fibers 32a and 34a is formed of a conductive material, the first and second nanowires 32c and 34c may be directly formed on the outer circumferential surfaces of the first and second fibers 32a and 34a without the first and second seed layers 32b and 34b as shown in FIG. 5.

Figure 6:
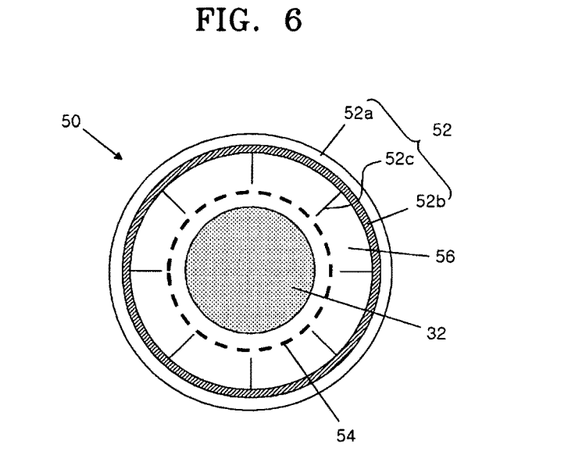
FIG. 6 is a cross-sectional view of a supercapacitor according to example embodiments.

FIG. 6 is a cross-sectional view of a supercapacitor according to example embodiments.

The same elements in FIG. 6 as those in FIGS. 1 through 5 are denoted by the same reference numerals.

In FIG. 6, a supercapacitor 50 is a core-shell type supercapacitor.

Referring to FIG. 6, the first fiber nanowire 32 is a central part of the supercapacitor 50. The first fiber nanowire 32 is surrounded by a separator 54. The separator 54 may be the same as the separator 36. The separator 54 and the first fiber nanowire 32 are surrounded by a third fiber nanowire 52. The third fiber nanowire 52 is an electrode of the supercapacitor 50 and forms a pair of electrodes with the first fiber nanowire 32. The third fiber nanowire 52 includes a third fiber 52a, a third seed layer 52b, and a plurality of third nanowires 52c. The third fiber 52a and the third seed layer 52b are cylindrical. The third seed layer 52b is attached to an inner circumferential surface of the third fiber 52a. The plurality of third nanowires 52c are disposed between the third seed layer 52b and the separator 54. The plurality of third nanowires 52c are disposed on an inner circumferential surface of the third seed layer 52b. Although several nanowires are illustrated in FIG. 6 for convenience, the plurality of third nanowires 52c are disposed very densely on the inner circumferential surface of the third seed layer 52b. The plurality of third nanowires 52c extend in a direction perpendicular to the inner circumferential surface of the third seed layer 52b toward the center of the first fiber nanowire 32. The third fiber 52a may be formed of the same material as, or a different material from, that of the first fiber 32a. The third seed layer 52b may be formed of the same material as, or a different material from, the first seed layer 32b. The plurality of third nanowires 52c may be formed of the same material as, or a different material from, that of the plurality of first nanowires 32c.

Figure 7:
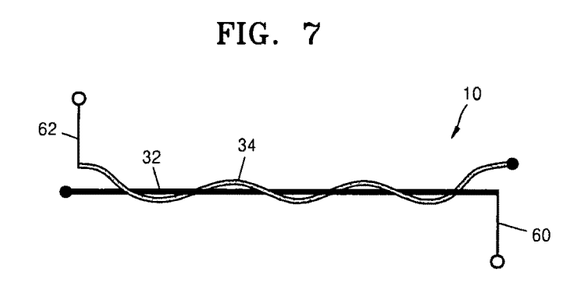
FIG. 7 illustrates a modification of the supercapacitor of FIG. 1, illustrating a case where a second fiber nanowire is wound around a first fiber nanowire.

FIG. 7 illustrates a modification of the supercapacitor 10 of FIG. 1, illustrating a case where the second fiber nanowire is wound (or twisted) around the first fiber nanowire.

Detailed structures of the first and second fiber nanowires 32 and 34 are not illustrated in FIG. 7 for convenience.

Referring to FIG. 7, the second fiber nanowire 34 is wound (or twisted) around the first fiber nanowire 32. Accordingly, a facing surface area between the first and second fiber nanowires 32 and 34 is increased and thus a specific capacitance of the supercapacitor 10 is further increased. The supercapacitor 10 of FIG. 7 may be formed on a flexible Kapton substrate. The supercapacitor 10 of FIG. 7 may be formed on various substrates having no conductivity (e.g., a glass substrate or a silicon substrate). Furthermore, if the first and second fiber nanowires 32 and 34 are twisted, no substrate may be used to form the supercapacitor 10 of FIG. 7. In FIG. 7, reference numeral 60 denotes a lead wire of the first fiber nanowire 32, and reference numeral 62 denotes a lead wire of the second fiber nanowire 34.

Because the first through third nanowires 32c, 34c, and 52c of the first through third fiber nanowires 32, 34, and 52 are formed of materials having piezoelectric characteristics, electricity may be generated by using the piezoelectric characteristics of the first through third nanowires 32c, 34c, and 52c. Hence, a nano generator may be realized by using only such a fiber nanowire, and an energy storage device or an energy supply source may be realized by attaching a device, which is obtained by combining the fiber nanowire with any of the aforesaid supercapacitors, to a flexible material.

FIGS. 8 through 11 illustrate energy-generating storage devices according to example embodiments.

Figure 8:
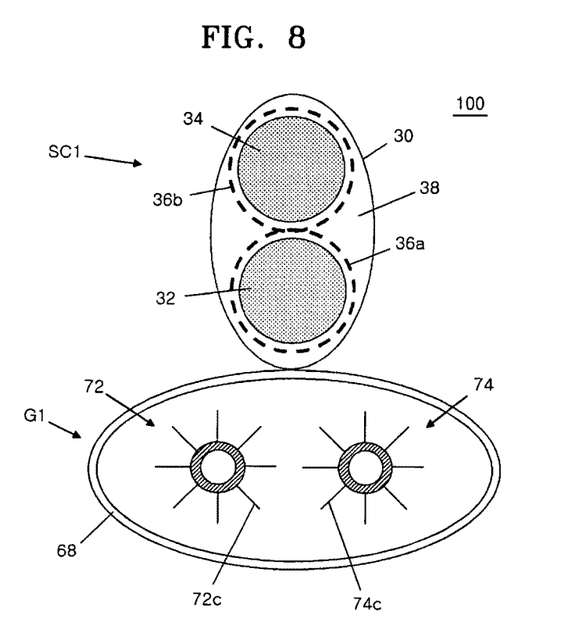
FIGS. 8 and 9 are cross-sectional views illustrating an energy generation and storage device including the supercapacitor of FIG. 1 according to example embodiments.

FIG. 8 is a cross-sectional view of an energy-generating storage device according to example embodiments.

Referring to FIG. 8, an energy-generating storage device 100 includes a nano generator G1 and a supercapacitor SC1. The supercapacitor SC1 may be the same as the supercapacitor 10 of FIG. 1, or the supercapacitor 50 of FIG. 6. The nano generator G1 includes fourth and fifth fiber nanowires 72 and 74. The fourth and fifth fiber nanowires 72 and 74 may be received (or positioned) in a flexible tube 68. The fourth fiber nanowire 72 may be the same as the first fiber nanowire 32 in terms of configuration and material. The fifth fiber nanowire 74 may be the same as the second fiber nanowire 34 in terms of configuration and material. Because fourth and fifth nanowires 72c and 74c of the fourth and fifth fiber nanowires 72 and 74 of the nano generator G1 have piezoelectric characteristics, electricity is generated when the fourth and fifth fiber nanowires 72 and 74 are supplied with external power. The generated electricity may be stored as energy in the supercapacitor SC1. The energy stored in the supercapacitor SC1 may be used as power if necessary, so that the supercapacitor SC1 may be used as a power supply source when the nano generator G1 stops operating. A portion of the nano generator G1 where positive (+) charges are generated (e.g., the fourth fiber nanowire 72), and a portion of the nano generator where negative (−) charges are generated (e.g., the fifth fiber nanowire 74) may be respectively connected to a terminal of the supercapacitor SC1 to which a positive voltage is applied (e.g., the first fiber nanowire 32) and to a terminal of the supercapacitor SC1 to which a negative voltage is applied (e.g., the second fiber nanowire 34).

Figure 9:
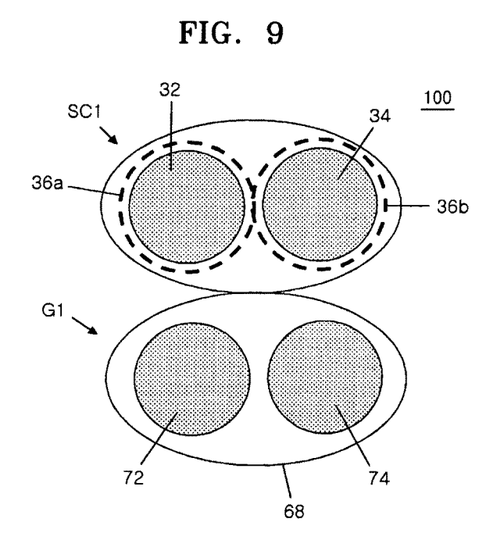

FIG. 9 is a modification of the energy-generating storage device of FIG. 8, illustrating a case where the nano generator G1 and the supercapacitor SC1 are stacked side by side.

In FIG. 9, the nano generator G1 and the supercapacitor SC1 are sequentially stacked. The nano generator G1 and the supercapacitor SC1 may be orientated in the same direction. Alternatively, the supercapacitor SC1 may be located under the nano generator G1.

Figure 10:
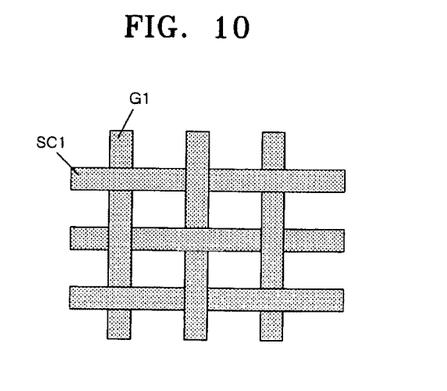
FIG. 10 is a plan view of an energy-generating storage device according to example embodiments.

FIG. 10 is a plan view of an energy-generating storage device according to example embodiments.

In FIG. 10, a plurality of the nano generators G1 and a plurality of the supercapacitors SC1 are arranged in a such a manner that the plurality of nano generators G1 and the plurality of supercapacitors SC1 are woven together.

Referring to FIG. 10, the plurality of nano generators G1 are arranged at set intervals parallel to one another. The plurality of supercapacitors SC1 are arranged to be spaced apart from one another and to perpendicularly intersect the plurality of nano generators G1. The plurality of supercapacitors SC1 are arranged at set intervals to intersect each of the plurality of nano generators G1. If one supercapacitor SC1 passes over one nano generator G1, neighbouring supercapacitors SC1 passes under the one nano generator G1. The plurality of nano generators G1 are arranged at set intervals to intersect each of the plurality of supercapacitors SC1.

Figure 11:
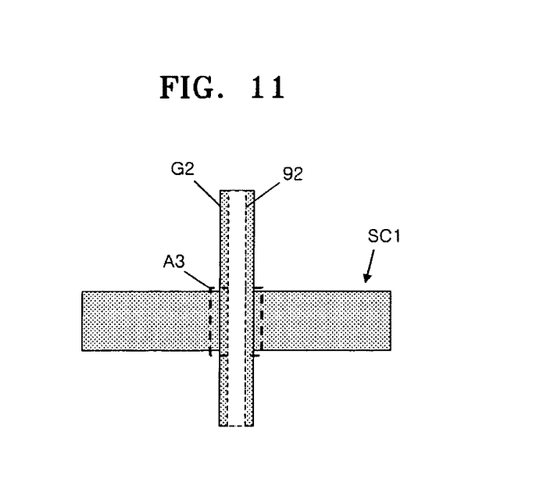
FIG. 11 is a plan view of an energy-generating storage device according to example embodiments.

FIG. 11 is a plan view of an energy-generating storage device according to example embodiments, In FIG. 11, a nano generator G2 includes one fiber nanowire.

Referring to FIG. 11, the supercapacitor SC1 perpendicularly intersects the nano generator G2. However, the supercapacitor SC1 does not have to perpendicularly intersect the nano generator G2. Thus, the supercapacitor SC1 may obliquely intersect the nano generator G2.

The nano generator G2 includes one fiber nanowire, for example, a sixth fiber nanowire 92. The sixth fiber nanowire 92 may be formed of the same material as that of the first fiber nanowire 32. Electricity may be generated from the nano generator G2 in a third area A3 where the nano generator G2 intersects with the supercapacitor SC1 when an external pressure is applied thereto.

Figure 12:
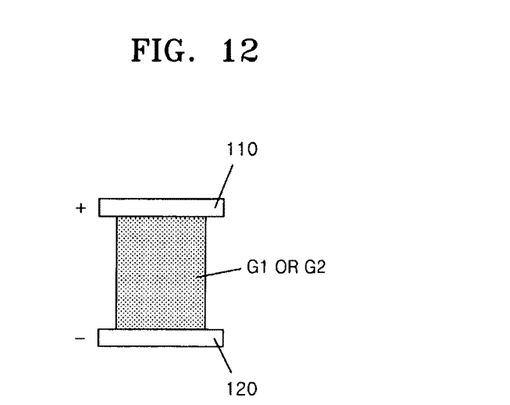
FIG. 12 is a cross-sectional view for explaining a relationship between a fiber nanowire and a first electrode and a second electrode disposed on both terminals of the fiber nanowire.

FIG. 12 is a cross-sectional view for explaining a relationship between the nano generator and electrodes disposed on both terminals of the nano generator.

Referring to FIG. 12, a first electrode 110 is disposed on one terminal of the nano generator G1 or G2, and a second electrode 120 is disposed on the other terminal of the nano generator G1 or G2. The first electrode 110 may be an electrode where positive charges are generated and the second electrode 120 may be an electrode where negative charges are generated, or vice versa. If the nano generator G1 or G2 is formed of an n-type semiconductor material having a first work function, one of the first and second electrodes 110 and 120 may be an electrode having a second work function and making a Schottky contact, and the remaining one of the first and second electrodes 110 and 120 may make an ohmic contact. The second work function may be greater than the first work function. The n-type semiconductor material having the first work function may be, for example, ZnO. If the n-type semiconductor material is ZnO, an electrode having the second work function and making a Schottky contact may be formed of, for example, Au or platinum (Pt).

FIGS. 13A through 13E are cross-sectional views illustrating a method of manufacturing a supercapacitor according to example embodiments.

In FIGS. 13A-13E, the figures on the right are side views of figures on the left.

Figure 13A:
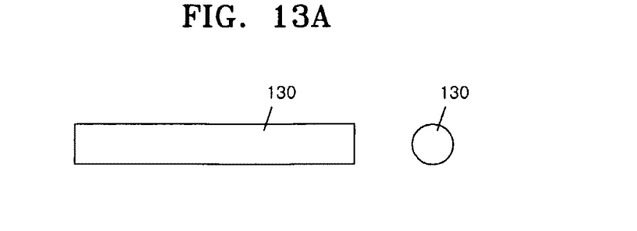
FIGS. 13A through 13E are cross-sectional views illustrating a method of manufacturing a supercapacitor according to example embodiments.

Referring to FIG. 13A, a fiber 130 having a set length is prepared. The fiber 130 may have a cylindrical cross-sectional shape, but example embodiments are not limited thereto. Thus, the fiber 130 may have any of various other cross-sectional shapes (e.g., a rectangular or elliptical cross-sectional shape). The fiber 130 may be formed of the same material as that of the first fiber 32a of FIG. 2.

Figure 13B:
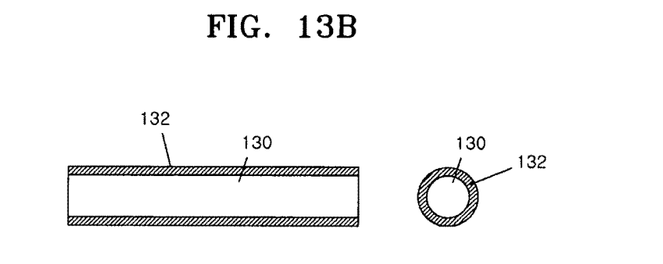

Referring to FIG. 13B, a seed layer 132 is formed on an outer circumferential surface of the fiber 130. The seed layer 132 may be formed of the same material as that of the seed layer 32b of FIG. 2. The seed layer 132 may be formed by using, for example, a sputter. The seed layer 132 may be formed to a thickness of about 0.1 nm to about 50 nm.

Figure 13C:
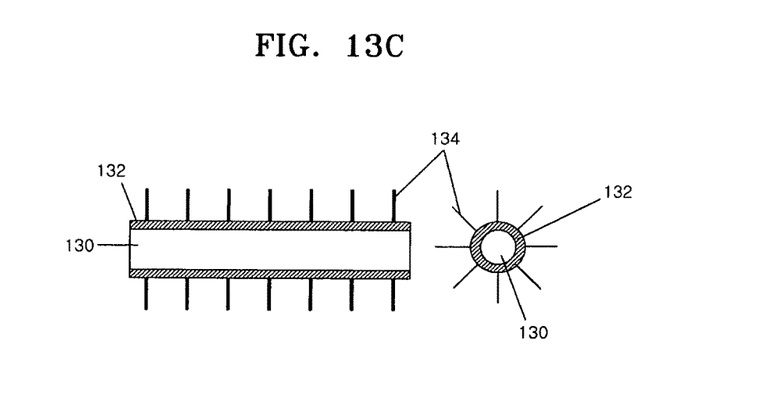

Referring to FIG. 13C, nanowires 134 are radially formed on an outer circumferential surface of the seed layer 132 to extend in a direction perpendicular to the outer circumferential surface of the seed layer 132. The nanowires 134 may be formed by reacting a resultant structure of FIG. 13B in a solution containing a raw material of the nanowires 134 for a set period of time, for example, for about 0.1 hours to about 5 hours. The solution is maintained at a temperature lower than 90° C. The solution may be maintained at a temperature of about 80° C. to about 120° C. The temperature of the solution and the reaction time may vary according to the material of the nanowires 134. Each of the nanowires 134 may have a thickness of, for example, about 40 nm to about 200 nm, and a length of, for example, about 1 μm to about 3 μm. The nanowires 134 may be formed of the same material as that of the first nanowires 32c of FIG. 2. The nanowires 134 may be formed by hydrothermal synthesis or chemical vapour deposition (CVD) synthesis.

Figure 13D:
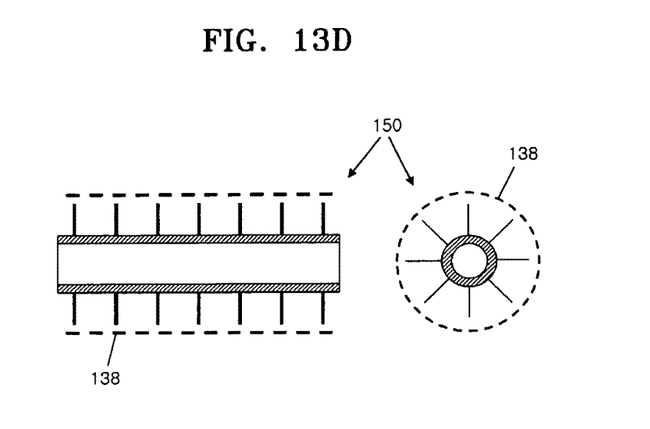

Referring to FIG. 13D, a resultant structure of FIG. 13C including the nanowires 134 is inserted into a separator 138 or may be surrounded by the separator 138, thereby forming a fiber nanowire 150 used as a first electrode of the supercapacitor. Although the first electrode is the nanowires 134, a resultant structure of FIG. 13D is referred to as the first electrode. A second electrode of the supercapacitor forming a pair of electrodes with the first electrode may be formed in the same manner as the first electrode.

Figure 13E:
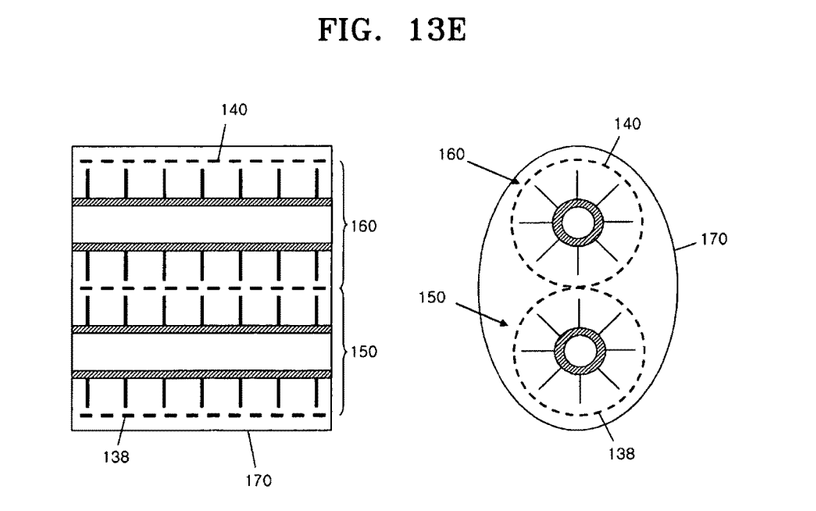

Referring to FIG. 13E, two fiber nanowires 150 and 160 are inserted into a sheath 170. The sheath 170 may be a flexible tube. An electrolyte is injected into the sheath 170. The electrolyte may be, for example, $KNO_3$. Lead wires are formed on the fiber nanowires 150 and 160. In this way, a flexible supercapacitor including the fiber nanowires 150 and 160 is manufactured.

Figure 14:
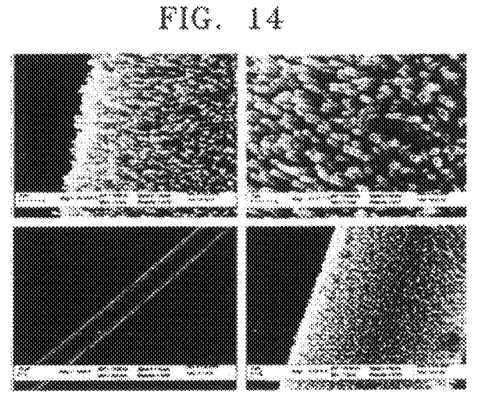
FIG. 14 illustrates a scanning electron microscope (SEM) image of fiber nanowires of a supercapacitor according to example embodiments.

FIG. 14 illustrates a scanning electron microscope (SEM) image of fiber nanowires of a supercapacitor according to example embodiments.

With respect to FIG. 14, the fiber nanowires were formed by forming a zinc oxide layer as a seed layer to a thickness of about 300 nm on an outer circumferential surface of a fiber that was Kevlar 129 and reacting a resultant structure thereof in a solution containing zinc nitrate hexahydrate and hexamethylenetetramine at a temperature of about 80° C. for 18 hours. Zinc oxide nanowires were formed on an outer circumferential surface of the zinc oxide layer as a result of the reaction.

Referring to FIG. 14, the zinc oxide nanowires were radially formed to extend in a direction perpendicular to a longitudinal direction of the fiber. Each of the zinc oxide nanowires had a thickness of about 50 nm to about 200 nm and a length of about 1 μm to about 3 μm. When observed with an electron microscope, the zinc oxide nanowires were single crystals (i.e., monocrystalline). It was determined that the zinc oxide nanowires could be suitably used as an electrode for a supercapacitor because the zinc oxide nanowires were formed very densely, had hexagonal shapes, and thus provided a high surface area.

Figure 15:
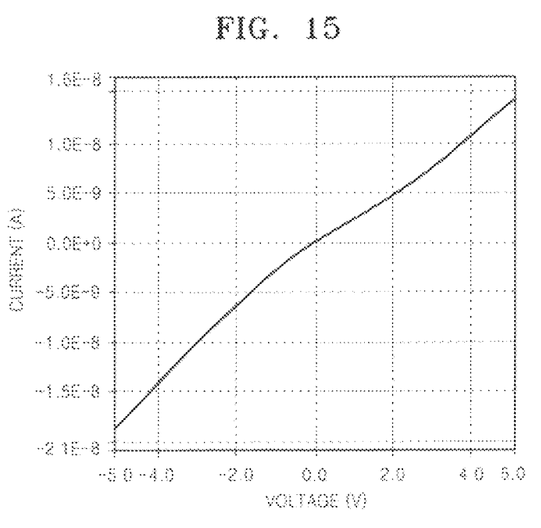
FIG. 15 illustrates current-voltage characteristics of two electrodes using the fiber nanowires of FIG. 14.

FIG. 15 illustrates current-voltage characteristics of two electrodes. The two electrodes were the fiber nanowires of FIG. 14 and the current-voltage characteristics were measured when the two electrodes were twisted.

Referring to FIG. 15, an average resistance between the two electrodes is $3 \times 10^8 \Omega$. It was determined that the two electrodes were separated from each other by a distance large enough not to create a short-circuit between them, mostly because the two electrodes were twisted but surfaces of the two electrodes become rough due to high-density nanowires.

Figure 16:
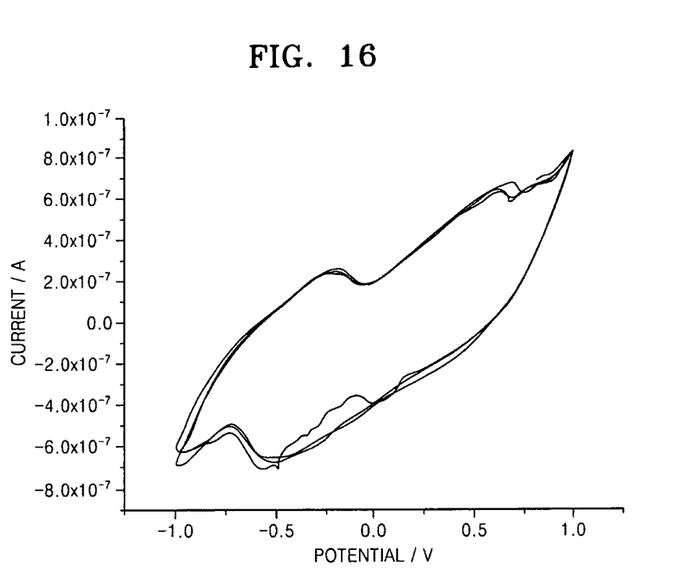
FIG. 16 illustrates a result of electrochemical analysis performed on a supercapacitor when 0.1 mol of $KNO_3$ was injected as an electrolyte between the two electrodes using the characteristics of FIG. 15.

FIG. 16 illustrates a result of electrochemical analysis performed on a supercapacitor when 0.1 mol of $KNO_3$ was injected as an electrolyte between the two electrodes having the characteristics of FIG. 15 at a voltage of about −1 V to about 1 V and at a scan rate of 0.5 V/s.

Referring to FIG. 16, it was concluded that the supercapacitor had typical charge and discharge characteristics. The supercapacitor had a specific capacitance of about $3.72 \times 10^{-3}$ $F/cm^2$. The specific capacitance of the supercapacitor could be further increased by optimizing an interfacial resistance between the zinc oxide nanowires and the electrolyte and a distance between the two electrodes.

As described above, because the supercapacitor according to example embodiments is formed of a fiber material, the supercapacitor is light weight, durable, and flexible. Also, because nanowires are used, a surface area of electrodes is increased and the size of the supercapacitor is reduced, thereby increasing a capacitance of the supercapacitor and increasing charge and discharge efficiency. Accordingly, the supercapacitor may be used as an energy storage medium, or an energy supply source for a flexible device, a display device, or a wearable device.

Furthermore, because ZnO nanowires are used, an environment-friendly energy-generating storage device may be realized. Because nanowires are manufactured at low temperature and thus may be formed on most fiber materials, the supercapacitor may be widely used.

Moreover, because a nano generator for converting mechanical energy into electrical energy is formed by manufacturing a material having piezoelectric characteristics as a nano structure on a fiber and the supercapacitor is formed on the nano generator, an integrated fiber supercapacitor for generating and storing power without being affected by external environment may be realized.

Although the capacitor in the above example embodiments is described as a supercapacitor, one skilled in the art will recognize that the capacitor is also known as an electric double-layer capacitor, supercondenser, pseudocapacitor, electrochemical double layer capacitor (EDLC), or ultracapacitor.

It should be understood that example embodiments described therein should be considered in a descriptive sense only and not for purposes of limitation. Accordingly, the spirit and scope of the present invention should not be defined by example embodiments but by the following claims.

What is claimed is:

1. A capacitor, comprising:
a first flexible electrode assembly;
a second flexible electrode assembly corresponding to the first flexible electrode assembly;
a separator configured to prevent contact between the first flexible electrode assembly and the second flexible electrode assembly; and
an electrolyte between the first flexible electrode assembly and the second flexible electrode assembly,
wherein the capacitor is a supercapacitor,
wherein each of the first and second flexible electrode assemblies are completely surrounded by the separator, and
wherein the separator includes a first separator surrounding the first flexible electrode assembly, and a second separator surrounding the second flexible electrode assembly.

2. The capacitor of claim 1, further comprising a tube including the first flexible electrode assembly, the second flexible electrode assembly, the separator, and the electrolyte.

3. The capacitor is claim 2, wherein the first flexible electrode assembly and the second flexible electrode are twisted together.

4. The capacitor of claim 2, wherein the tube is a rigid tube or a flexible tube.

5. A capacitor, comprising:
a first flexible electrode assembly;
a second flexible electrode assembly corresponding to the first flexible electrode assembly;
a separator configured to prevent contact between the first flexible electrode assembly and the second flexible electrode assembly; and
an electrolyte between the first flexible electrode assembly and the second flexible electrode assembly,
wherein the capacitor is a supercapacitor and
wherein one of the first flexible electrode assembly and the second flexible electrode assembly is inside the other one.

6. The capacitor of claim 5, wherein the one flexible electrode assembly inside the other flexible electrode assembly is surrounded by the separator.

7. The capacitor of claim 1, wherein the separator is a porous separator permeable to ions.

8. The capacitor of claim 1, wherein the first flexible electrode assembly includes a fiber, a seed layer on an outer circumferential surface of the fiber, and a plurality of nanowires on an outer circumferential surface of the seed layer, the plurality of nanowires extending in a direction perpendicular to a longitudinal direction of the fiber.

9. The capacitor of claim 8, wherein the fiber is at least one of a polymer fiber, a carbon fiber, a metal fiber, and an optical fiber.

10. The capacitor of claim 8, wherein surfaces of the plurality of nanowires are covered with a conductive layer.

11. The capacitor of claim 8, wherein the plurality of nanowires have piezoelectric characteristics.

12. The capacitor of claim 1, wherein the second flexible electrode assembly includes a fiber, a seed layer on an outer circumferential surface of the fiber, and a plurality of nanowires an on outer circumferential surface of the seed layer, the plurality of nanowires extending in a direction perpendicular to a longitudinal direction of the fiber.

13. The capacitor of claim 12, wherein the fiber is at least one of a polymer fiber, a carbon fiber, a metal fiber, and an optical fiber.

14. The capacitor of claim 12, wherein surfaces of the plurality of nanowires are covered with a conductive layer.

15. The capacitor of claim 12, wherein the plurality of nanowires have piezoelectric characteristics.

16. An energy-generating storage device comprising: the capacitor according to claim 1; and
a nano generator contacting the supercapacitor, wherein the nano generator includes a tube having at least one fiber nanowire, and the at least one fiber nanowire has piezoelectric characteristics.

17. The energy-generating storage device of claim 16, further comprising a plurality of fiber nanowires,
wherein each of the fiber nanowires includes a fiber, a seed layer on an outer circumferential surface of the fiber, and a plurality of nanowires on an outer circumferential surface of the seed layer, and
the plurality of nanowires extends in a direction perpendicular to a longitudinal direction of the fiber.

18. The energy-generating storage device of claim 16, wherein the capacitor and the nano generator are stacked side by side.

19. The energy-generating storage device of claim 16, wherein the capacitor and the nano generator are alternately arranged.

20. The energy-generating storage device of claim 16, further comprising a plurality of fiber nanowires,
wherein a first electrode and a second electrode are on both terminals of each the fiber nanowires, and
one of the first electrode and the second electrode is in Schottky contact with each of the fiber nanowires, and the other electrode is in ohmic contact with each of the fiber nanowires.

21. A method of manufacturing a capacitor, the method comprising:
    forming a first flexible electrode assembly and a second flexible electrode assembly;
    separating the first flexible electrode assembly from the second flexible electrode assembly by using a separator; and
    injecting an electrolyte between the first flexible electrode assembly and the second flexible electrode assembly,
    wherein the capacitor is a supercapacitor,
    wherein separating the first flexible electrode assembly from the second flexible electrode assembly by using the separator includes completely surrounding each of the first and second flexible electrode assemblies with the separator, and
    wherein separating the first flexible electrode assembly from the second flexible electrode assembly by using the separator includes,
        surrounding the first flexible electrode assembly with a first separator, and
        surrounding the second flexible electrode assembly with a second separator.

22. The method of claim 21, further comprising forming the first flexible electrode assembly, the second flexible electrode assembly, the separator, and the electrolyte in a tube.

23. The method of claim 22, wherein the tube is a rigid tube or a flexible tube.

24. A method of manufacturing a capacitor, the method comprising:
    forming a first flexible electrode assembly and a second flexible electrode assembly;
    separating the first flexible electrode assembly from the second flexible electrode assembly by using a separator; and
    injecting an electrolyte between the first flexible electrode assembly and the second flexible electrode assembly,
    wherein the capacitor is a supercapacitor,
    wherein separating the first flexible electrode assembly from the second flexible electrode assembly by using the separator includes completely surrounding one of the first and second flexible electrode assemblies with the separator, and
    wherein forming the first electrode assembly and forming the second electrode assembly, collectively include forming one of the first flexible electrode assembly and the second flexible electrode assembly inside the other one.

25. The method of claim 24, wherein separating the first flexible electrode assembly from the second flexible electrode assembly by using the separator includes surrounding the one flexible electrode assembly, which is inside the other flexible electrode assembly, with the separator.

26. The method of claim 21, wherein one of the first flexible electrode assembly and the second flexible electrode assembly is wound around the other one.

27. The method of claim 21, wherein the separator is a porous separator permeable to ions.

28. The method of claim 21, wherein forming the first flexible electrode assembly includes:
    forming a seed layer on an outer circumferential surface of a fiber; and
    forming a plurality of nanowires on an outer circumferential surface of the seed layer so that the plurality of nanowires extends in a direction perpendicular to a longitudinal direction of the fiber.

29. The method of claim 28, wherein the plurality of nanowires are formed by hydrothermal synthesis or chemical vapor deposition (CVD) synthesis.

30. The method of claim 28, further comprising forming a conductive layer that covers surfaces of the plurality of nanowires.

31. The method of claim 21, wherein forming the second flexible electrode assembly includes:
    forming a seed layer on an outer circumferential surface of a fiber; and
    forming a plurality of nanowires on an outer circumferential surface of the seed layer so that the plurality of nanowires extends in a direction perpendicular to a longitudinal direction of the fiber.

32. The method of claim 31, wherein the plurality of nanowires are formed by hydrothermal synthesis or chemical vapor deposition (CVD) synthesis.

33. The method of claim 31, further comprising forming a conductive layer that covers surfaces of the plurality of nanowires.

* * * * *